(12) United States Patent
Hausladen et al.

(10) Patent No.: US 8,512,623 B2
(45) Date of Patent: Aug. 20, 2013

(54) LABELER AND A LABELING METHOD FOR LABELING PLASTIC CONTAINERS IN THE BLOW MOLD IN A ROTARY BLOW MOLDER

(75) Inventors: Wolfgang Hausladen, Moetzing (DE); Christian Popp, Regensburg (DE); Johannes Weiss, Nittenau (DE)

(73) Assignee: Krones AG, Neutraubling (DE)

( * ) Notice: Subject to any disclaimer, the term of this patent is extended or adjusted under 35 U.S.C. 154(b) by 85 days.

(21) Appl. No.: 13/010,948

(22) Filed: Jan. 21, 2011

(65) Prior Publication Data

US 2011/0180975 A1 Jul. 28, 2011

(30) Foreign Application Priority Data

Jan. 25, 2010 (DE) .......................... 10 2010 001 192

(51) Int. Cl.
*B29C 49/24* (2006.01)
*B29C 49/36* (2006.01)
(52) U.S. Cl.
USPC ........... 264/509; 425/503; 425/522; 425/534; 425/540
(58) Field of Classification Search
USPC .................. 425/503, 174.8 E, 504, 522, 534, 425/540; 264/509
See application file for complete search history.

(56) References Cited

U.S. PATENT DOCUMENTS

| 3,324,508 | A | * | 6/1967 | Dickinson .............. 425/174.8 E |
| 3,575,409 | A |   | 4/1971 | Calvert |
| 4,233,022 | A | * | 11/1980 | Brady et al. .................. 425/525 |
| 4,355,967 | A |   | 10/1982 | Hellmer |
| 4,601,926 | A | * | 7/1986 | Jabarin et al. ................. 264/509 |
| 4,639,206 | A |   | 1/1987 | Darr |
| 4,737,099 | A | * | 4/1988 | Kaminski ...................... 425/504 |
| 5,039,298 | A |   | 8/1991 | Takakusaki et al. |
| 5,266,149 | A |   | 11/1993 | Collette et al. |
| 5,885,408 | A |   | 3/1999 | Kaminski |
| 5,980,233 | A |   | 11/1999 | Oosaki |

(Continued)

FOREIGN PATENT DOCUMENTS

| EP | 0377735 A1 | 7/1990 |
| EP | 0882559 A2 | 12/1998 |

(Continued)

OTHER PUBLICATIONS

Search Report for German Application No. 10 2010 001 192.4 received Feb. 7, 2011.

(Continued)

*Primary Examiner* — Robert B Davis
(74) *Attorney, Agent, or Firm* — Marshall, Gerstein & Borun LLP

(57) ABSTRACT

A labeler for labeling plastic containers in the blow mold as well as to a labeling method for use of the labeler, where due to the fact that the rotating insertion device of the labeler comprises articulated arms having each rotatably supported thereon a gripper, it is possible to remove labels from stationary magazines at a comparatively low relative speed. The articulated arms are able to follow the path of the blow molds during insertion of the labels with high speed. The grippers are rotatably supported which allows an exact radial orientation of the gripper with respect to the axis of rotation of the blow wheel that continues to rotate during insertion of the labels, to thus allow a particularly accurate and reliable labeling.

19 Claims, 5 Drawing Sheets

(56) References Cited

U.S. PATENT DOCUMENTS

| | | |
|---|---|---|
| 6,264,876 B1 | 7/2001 | Ballay |
| 6,649,118 B2 * | 11/2003 | Dunlap et al. ............... 264/509 |
| 6,649,119 B2 | 11/2003 | Dunlap et al. |
| 2003/0146549 A1 | 8/2003 | Dunlap et al. |

FOREIGN PATENT DOCUMENTS

| | | |
|---|---|---|
| JP | 07205265 A | 8/1995 |
| JP | 09277362 A | 10/1997 |
| JP | 3335448 B2 | 10/2002 |
| WO | WO-0078526 A1 | 12/2000 |
| WO | WO-2008018547 A1 | 2/2008 |

OTHER PUBLICATIONS

European Search Report for EP10194952, dated Oct. 19, 2012.
Search report for European Application No. 10 19 4952, dated Feb. 28, 2013.

* cited by examiner

LABELER AND A LABELING METHOD FOR LABELING PLASTIC CONTAINERS IN THE BLOW MOLD IN A ROTARY BLOW MOLDER

CROSS-REFERENCE TO RELATED APPLICATION

The present application claims the benefit of priority of German Application No. 102010001192.4, filed Jan. 25, 2010. The entire text of the priority application is incorporated herein by reference in its entirety.

FIELD OF THE DISCLOSURE

The disclosure relates to a labeler for labeling plastic containers in the blow mold, as well as to a labeling method for use in the labeler, such as used in bottling operations.

BACKGROUND

As is generally known, plastic containers can be already be labeled in the course of the production process through so-called in-mold labeling by introducing the labels in the blow mold before blow molding of the containers is executed.

In rotary blow molders the labels are, as described e.g. in U.S. Pat. No. 6,649,119 B2 removed from stationary magazines by rotating transfer pallets, transferred to a transfer wheel provided with radially displaceable and rotatable transfer arms and arranged between the feeder star wheel and the discharge star wheel, and introduced by these transfer arms into the open blow mold. The above arrangement is, however, disadvantageous not only insofar as the separate transfer pallets used for removing the labels entail costs but also insofar as, on the one hand, only a small angular range of the machine can be utilized for inserting the labels into the blow molds and, on the other hand, the angular range of the machine that is available for blowing molding is reduced to an undesirable extent. It follows that the manufacturing efficiency of the machine is not satisfactory.

U.S. Pat. No. 5,266,149 A describes a labeling system for a rotary blow molder in the case of which a label magazine and a transfer arm are arranged directly on the blow wheel for each mold half. This system is, however, disadvantageous insofar as a large number of magazines and transfer systems is required and insofar as the magazines on the blow wheel are difficult to access during the production process.

WO 00 785 26 A1 describes a stationary labeling system in which two grippers, which are directed away from one another, carry out an oscillatory up and down movement between two stationary label magazines and two blow mold halves of a blow wheel, the grippers being first moved horizontally away from each other at the reversal points so as to pick up the labels from the magazines and introduce them into the blow mold halves and being then moved towards each other so as to change between the reversal points. Such a cycle-type machine is, however, disadvantageous insofar as a sufficiently high manufacturing efficiency cannot be achieved.

SUMMARY OF THE DISCLOSURE

It is therefore one aspect of the present disclosure to provide a device and a method for in-mold labeling without the above-mentioned drawbacks.

This aspect is achieved in that the rotating insertion device of the labeler comprises articulated urns having each rotatably supported thereon a gripper. With the aid of the articulated arms, labels can be removed from stationary magazines at a comparatively low relative speed. Likewise, the articulated arms are able to follow the path of the blow molds during insertion of the labels with high speed. The fact that the grippers are rotatably supported also allows an exact radial orientation of the gripper with respect to the axis of rotation of the blow wheel that continues to rotate during insertion of the labels. This increases the accuracy and the reliability of the labeling process.

Preferably, the gripper comprises gripping elements which are adapted to be pivoted towards the blow mold. This allows, on the basis of a comparatively simple and light structural design of the gripper, said gripper to be pivoted into the blow mold with minimal dimensions and to bring the labels then into contact with the inner wall of the blow mold.

Preferably, the gripping elements are configured such that they correspond to the negative of a portion of the blow mold. It is thus possible to bring the largest possible part of the label surface into contact with the blow mold. This results in an increase in adhesion, especially when the labels are electrostatically charged.

According to a particularly advantageous embodiment, the gripper comprises a centering tip by means of which the gripper is centrally oriented in the blow mold. It is thus guaranteed that the gripper will maintain a substantially unchanged position in the blow mold during insertion of the labels.

Preferably, the labeler is so conceived that, when the gripper is pivoted into the blow mold, the rotary position of the gripper is adapted to be fixed relative to the articulated arm. The gripper can thus be centered in the blow mold in a particularly fast and reliable manner.

Preferably, the insertion device is configured such that it removes the labels directly from the label magazine. A particularly space-saving arrangement can be realized in this way.

Preferably, the gripper is controlled such that, when it picks up a label, it moves across said label in rolling contact therewith. This prevents the labels from slipping and/or crumpling. In addition, gripping elements having a curved surface can be used.

Preferably, the gripper is able to pick up two labels at substantially opposed positions. It is thus possible to attach labels to the front and to the back of the bottle in one insertion process.

According to a preferred embodiment, the labeler according to the present disclosure additionally comprises a charging device for electrostatically charging the labels for attaching them to the blow mold. This allows the labels to be attached without any additional auxiliary substances and avoids technically complicated suction nozzles and channels which may be in the way in the blow molds.

Preferably, the insertion device is arranged below a feeder star wheel or a discharge star wheel of the blow wheel and is coupled thereto. This will save space and the angular range of the machine required for label insertion will thus be rendered comparatively small, i.e. the angular range available for blow molding the bottles will only be reduced to a minor extent.

According to a further advantageous embodiment, the insertion device is configured as a separate transfer star wheel and is arranged between the feeder star wheel and the discharge star wheel of the blow wheel. In this case, conventional feeder and discharge star wheels can also be used for retrofitting the labeler according to the present disclosure.

According to another advantageous embodiment, the insertion device is arranged on the blow wheel, in particular on, between or above the blow molds. The grippers can thus be oriented more easily when the labels are inserted into the blow mold, since the articulated arms and the blow molds rotate about a common axis.

The one aspect of the disclosure is additionally achieved by a labeling method which is used for labeling plastic containers in the blow mold in a rotary blow molder, making use of the labeler according to the present disclosure, and which is characterized by the following steps: equipping a gripper with at least one label; pivoting the gripper, equipped with the label, into a blow mold and centering the gripper within said blow mold by locking it in position on said blow mold or on the mold support thereof; spreading the gripper and attaching the label to the blow mold while maintaining the centered position of the gripper; and pivoting the gripper away from the blow mold.

This allows labeling to be carried out with high precision and with a low expenditure of time.

Preferably, the gripper is turned when it picks up the label. It is thus possible to equip the gripper with labels on both sides thereof from a magazine arranged outside the gripper path. This arrangement is particularly easy to realize and allows easy access to the magazines also during production.

Preferably, the label is coated with a thermosensitive adhesive and said adhesive is activated by heating the blow mold sectionwise.

This allows easy handling of the labels in the magazine during removal of the labels and during their insertion.

BRIEF DESCRIPTION OF THE DRAWINGS

Preferred embodiments of the disclosure are shown in the drawing and explained herein below.

DETAILED DESCRIPTION OF THE PREFERRED EMBODIMENT

Figure 1:
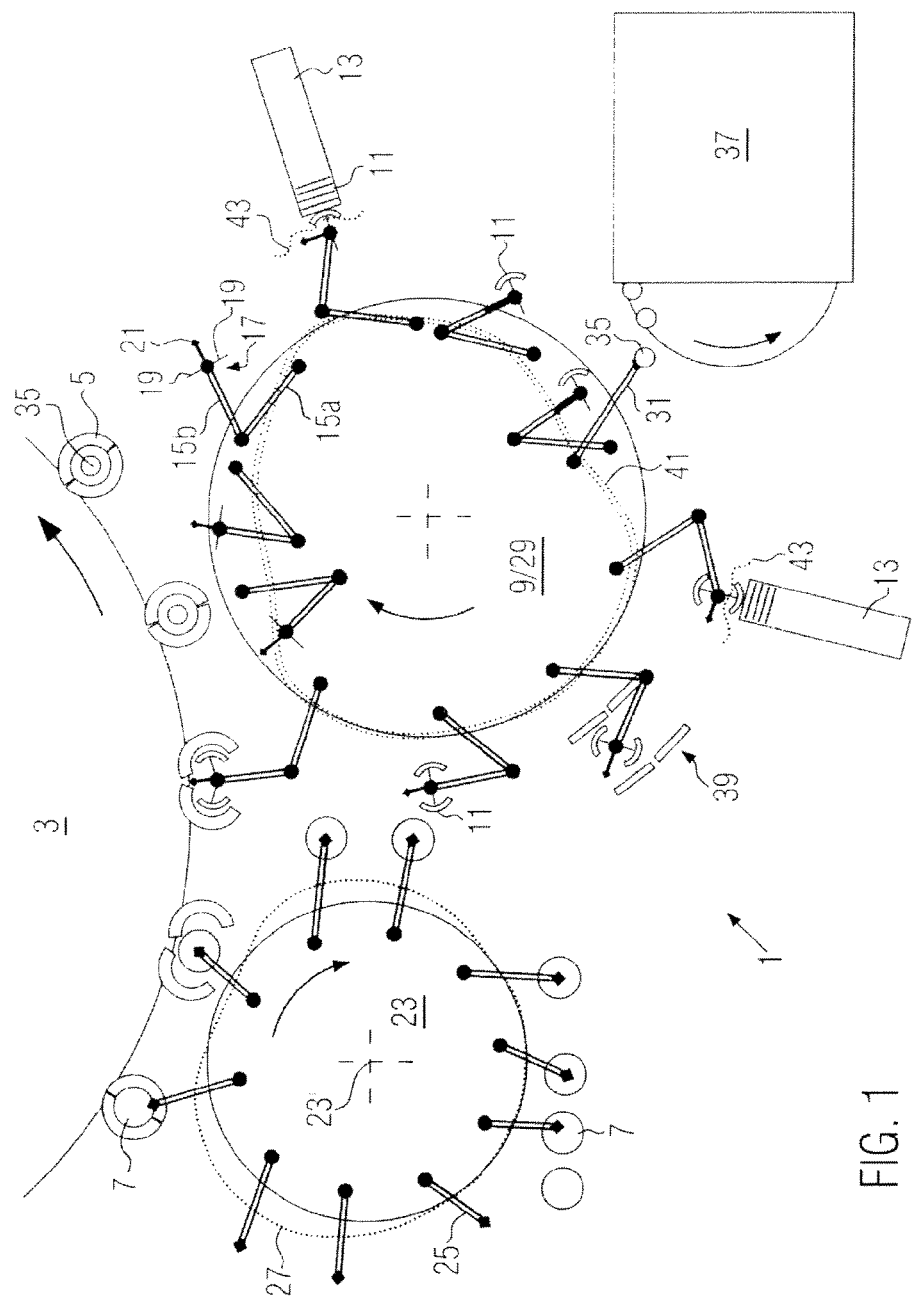
FIG. 1 shows a schematic top view of a first embodiment.

As can be seen in FIG. 1, a first embodiment of the labeler 1 according to the present disclosure comprises a blow wheel 3 provided with a plurality of blow molds 5 for blowing plastic containers 7, such as bottles, in particular PET bottles, and a rotating insertion device 9 for removing labels 11 from stationary label magazines 13 and inserting the labels 11 into the open blow molds 5 with the aid of articulated arms 15 that are rotatably supported on the insertion device 9. Each of these articulated arms 15 has, in turn, rotatably supported thereon a gripper 17 with gripping elements 19 and a centering tip 21 for orienting the gripper 17 centrally in the open blow mold 5. The insertion device 9 has additionally provided thereon the control cam 41 for pivoting the articulated arms 15 and the control cam 43 for rotating the labeling heads 17.

The labeler 1 additionally comprises a discharge star wheel 23, e.g. a pitch reduction star wheel, with rotatably supported gripper arms 25 of variable lever length, which are used for removing the fully blown bottles 7. The gripper arms 25 are controlled in the usual way by a control cam 27.

Above the insertion device 9, a feeder star wheel 29, e.g. a pitch reduction star wheel, is arranged preferably coaxially therewith. Said feeder star wheel 29 has arranged thereon, analogously to the discharge star wheel 27, gripper arms 31 controlled via a control cam 33 (not shown in FIG. 1 for the sake of clarity) and used for removing preforms 35 from an oven 37 and introducing the preforms 35 into the blow molds 5.

In the example shown, the insertion device 9 and the feeder star wheel 29 share a rotating base plate having the articulated arms 15 mounted on the lower surface thereof and the gripper arms 31 on the upper surface thereof. Accordingly, the control cam 41 is implemented below the articulated arms 15 as a cam plate and the control cam 33 is implemented above the gripper arms 31 as a cam plate. For the sake of simplicity, the articulated arms 15 are fully depicted with solid lines in FIG. 1.

The labeler 1 additionally comprises a charging device 39, e.g. one or a plurality of high-voltage electrodes, for electrostatically charging the labels 11.

Figure 2:
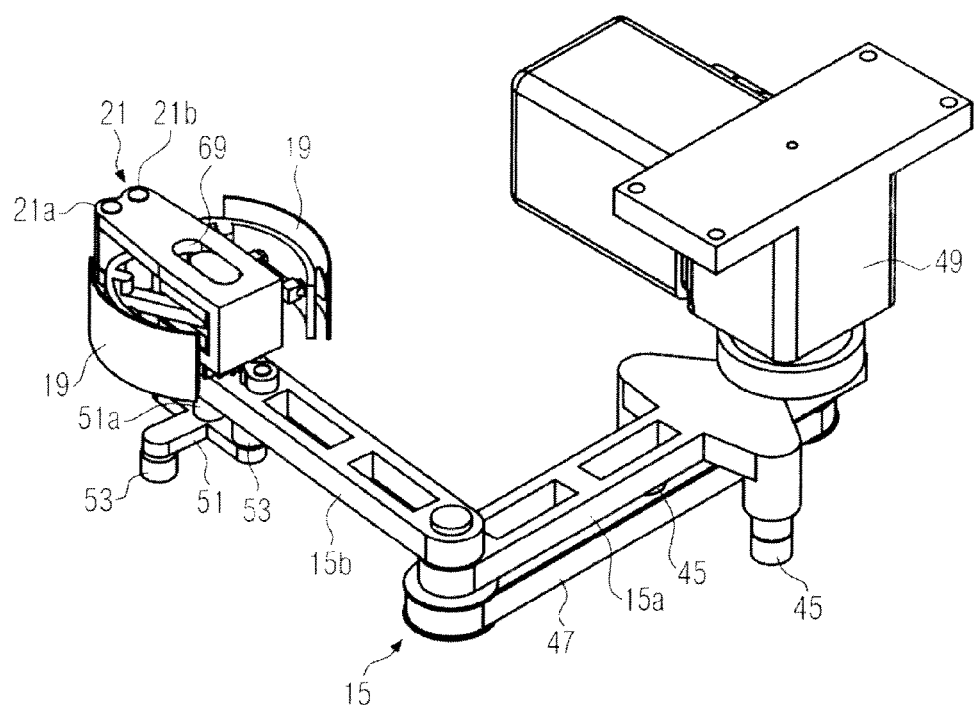
FIG. 2 shows an oblique view of an articulated arm of the insertion device.

FIG. 2 illustrates the mode of operation of the articulated arm 15. According to said FIG. 2, the articulated arm 15 is configured as a so-called SCARA arm, comprising an inner arm 15a and an outer arm 15b as well as a gripper 17, i.e. it is three-membered in total. The position of the inner arm 15a is controlled via two cam rollers 45 and the two-path control cam 41. The outer arm 15b is driven via a belt drive 47 by a servomotor 49. In the embodiment shown, the rotary position of the gripper 17 is controlled by a rotary cross joint 51 with four rollers 53 and the control cams 43. In order to minimize centrifugal forces, the articulated arms 15 and the grippers 17 are preferably implemented in a lightweight mode of construction.

For rotating the gripper 17, said gripper may alternatively have provided thereon only one roller 53 or a cam with a transmission—such as in the case of a combination of a gear and a rack or in the case of an extension arm—an additional servomotor or a pneumatic drive. In the case of an active rotary mechanism, the control cams 43 can be dispensed with.

For each rotation of the insertion device 9, the gripper 17 is rotated through 360° in total or twice 180° so that the opposed gripping elements 19 will be able to pick up the respective labels 11 from a magazine 13 arranged outside of the path of the grippers 17. Alternatively, a magazine 13 may, however, be arranged on the inner side so that the gripper 17 need not be turned by 180° between the magazines 13. The gripping elements 19 may be configured such that the gripper 17 is able to pick up an individual label 11, two identical or two different labels 11.

In addition, the arrangement is configured such that, while picking up the labels 11, the gripper 17 is rotated by the control cams 43 such that the gripping elements 19 will roll across the labels 11 in a controlled manner. This will, on the one hand, prevent the labels 11 from slipping and/or crumpling. On the other hand, it will improve the transfer of the labels 11 to the curved gripping element 19 whose curvature substantially corresponds to the negative of the blow mold portion to which a label 11 is to be applied. This will guarantee sufficient adhesion of the electrostatically charged labels 11 to the blow mold 5.

In addition, the gripping elements 19 may be implemented elastically, e.g. in the form of suction cups, or they may be supported elastically, so as to guarantee that, when rolling across the labels 11, the contact between the gripping elements 19 and the labels 11 will be sufficiently intensive and as uniform as possible. This will counteract the circumstance that the labels 11 are provided in the magazine 13 in a planar condition, whereas the gripping elements 19 are conducted along the magazine 13 on a circular path, i.e. they will approach the label 11 tangentially. Alternatively or additionally, the circular path of the gripping elements 19 may, along the labels 11, be converted at least partially into a linear movement. To this end, the gripping elements 19 may be configured eccentrically and/or the articulated arms 15 may carry out an appropriate countermovement.

In order to facilitate the removal of the labels 11, a discharge unit (not shown), e.g. an ionization device, may be provided at the transfer site, e.g. below the magazines 13. This discharge unit will, in addition, support a reproducible charging of the labels 11 through the charging device 39.

A particularly advantageous utilization of the available space will be accomplished when a first label magazine 13 is arranged between the blow wheel 3 and the oven 37 and when a second magazine 13 is arranged between the oven 37 and the electrodes 39.

Figure 3:
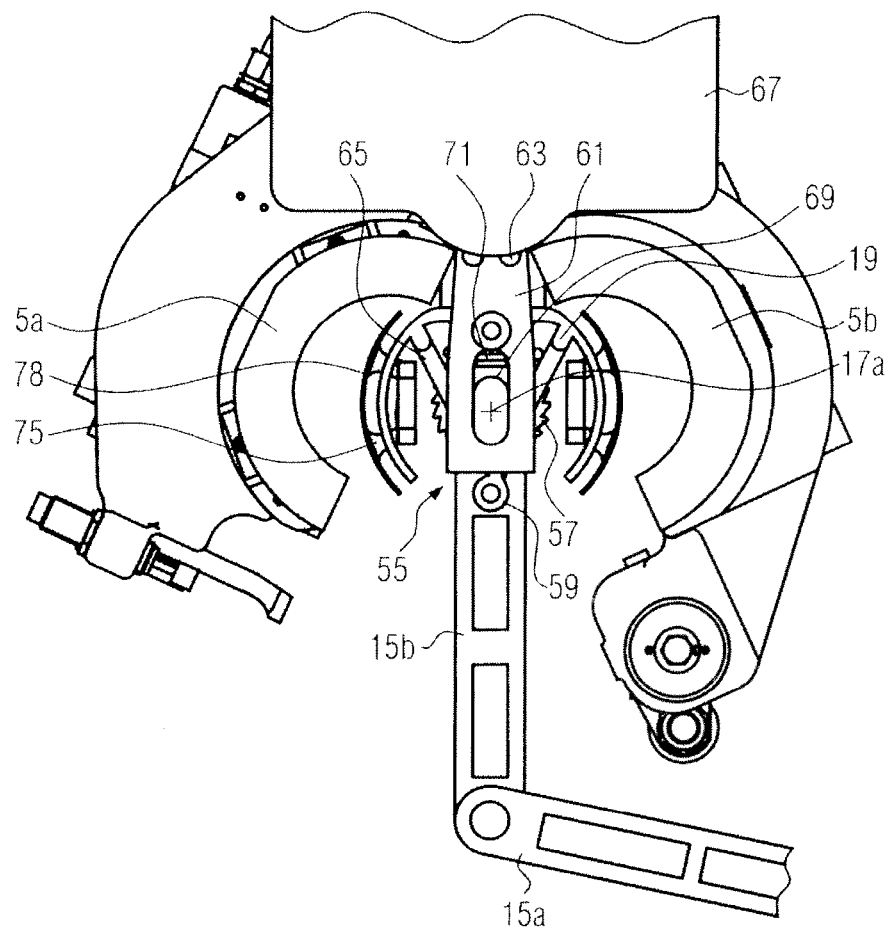
FIG. 3 shows a top view of a gripper positioned in the blow mold.

As can be seen from FIG. 3, the gripper 17 has provided thereon a locking mechanism 55 by means of which the rotary position of the gripper 17 is arrested, so that the centering tip 21 of the gripper 17 will essentially be in alignment with the outer arm 15b as long as the gripper 17 is neither rotated by the control cams 43 nor the centering tip 21 brought into locking engagement with the open blow mold 5. The locking mechanism 55 may e.g. be implemented as a ratchet with a sawtooth gear 57 and a detent lever 59. The gripper 17 may, however, also be rotated by a separate servomotor (not shown) and, if necessary, be held in position by the latter such that it is in alignment with the outer arm 15b.

The gripping elements 19 can be pivoted or spread sideways in the direction of the blow mold 5. To this end, the gripping elements 19 are rotatably supported in the upper and in the lower base plate 61 of the gripper 17 via pins 63, and they are operated via a lever mechanism 65 e.g. as follows:

in FIG. 3, the centering tip 21 lockingly engages the mold support 67 of the blow mold centrally between the mold halves 5a,b with the aid of the two radii 21a,b defined around the pins 63. The centering tip 21 may, however, have any shape that allows a stable locking engagement with the blow mold 5 and the mold support 67, respectively. The articulated arm 15 is then overturned, i.e. it is not only entrained along the circular path of the blow mold 5 so as to maintain its central position between the mold halves 5a,b, but it also displaces the shaft 51a and the axis of rotation 17a of the gripper 17 in the groove 69 against the return spring 71 so that the gripping elements 19, configured as perforated vacuum plates 73 and suction devices 75, will be pressed against the mold halves 5a,b. The gripping elements 19 can thus be spread apart simply under the influence of force of the articulated arm 15 in the direction of the centering tip 21 and by an advance movement of the outer arm 15b.

It is, however, also imaginable to spread the gripper 17 with the aid of a pneumatic cylinder or a servomotor via a separate mechanism in order to avoid the mechanical loads occurring during overturning of the articulated arm 15 or in order to move the gripper 17 independently of the position of the arms 15a,b. The lever mechanism 65 could be replaced by an arbitrary mechanism causing the gripping elements 19 to pivot by one or a plurality of levers, a slotted link-controlled rotary movement or by a combination thereof.

The two radii 21a,b of the centering tip 21 guarantee, due to their two-point positioning on the mold support 67, that the gripper 17 is oriented centrally between the mold halves 5a,b and radially with respect to the blow wheel 3. In view of the fact that the blow wheel 3 and the insertion device 9 rotate continuously during transfer of the labels to the blow mold 5, the outer arm 15b must be slightly pivoted about the axis of rotation 17a relative to the gripper 17 while the labels are being transferred. The locking mechanism 55 is therefore configured such that the articulated arm 15 can be pivoted, relative to the gripper 17 locked in position on the blow mold 5, such that the gripper 17 will be oriented centrally and radially with respect to the blow wheel 3 during spreading.

In the embodiment shown, the gripping elements 19 remove the labels 11 directly from the label magazine 13, where the stored labels 11 are already provided with an activatable adhesive, preferably with a thermosensitive adhesive, which will not establish any firm adhesive bonds at room temperature. The labels can thus be picked up in a particularly space-saving manner. The adhesive can be activated e.g. through heating elements which are integrated in the blow mold 5 and isolated from cooled areas of the blow mold 5 by suitable blocking layers and which selectively heat the blow mold 5 above the labels 11.

Alternatively, the labels 11 can directly be introduced in the blow mold 5 by means of the suction devices 75 or suitably configured suction cups without the perforated vacuum plates 73. In this case, the adhesive will be applied only to a certain area or certain areas of the label 11, e.g. by means of an adhesive pallet carousel (not shown), which removes the labels 11 from the magazine 13 and applies an adhesive to certain parts thereof. To this end, the adhesive pallets are configured such that no adhesive will be applied at the point where the suction device 75 takes hold of the label 1. Before the suction device 75 can pick up the label 11, which has an adhesive applied to certain parts thereof, the label 111 must be turned. This can be done by using e.g. a conventional gripper drum (not shown) which is provided with vacuum grippers or mechanical grippers and which takes over the label 11 with the non-adhesive side from the adhesive pallet carousel and passes it on to the gripper 17. This variant allows also the use of adhesives which need not be activated. It follows that additional activating units, such as heating elements, on the blow mold 5 will not be necessary in this case.

Alternatively to an application of an adhesive to certain areas by means of an adhesive pallet carousel, partially self-adhesive labels 11 can be detached from a carrier strip on a detachment edge in the manner known and picked up directly by the suction devices 75 at label areas that are free of adhesive. In this case, the above-described additional unit for turning the labels 11 can be dispensed with.

In addition, the gripping elements 19 can be provided with an adhesive-repellent coating so that they will also be able to pick up and insert labels 11 which have applied thereto a non-activatable adhesive in full area.

Before the labels 11 are introduced in the blow mold 5, they should be provided, at least partially, with an adhesive layer facing the bottle 7 to be blown, so as to firmly connect the labels 11 to the bottles 7 during the blowing process.

The transfer of the labels 11 to the blow mold 5 is effected through electrostatic attraction between the labels 11 and the grounded or oppositely charged blow molds 5, while simultaneously deactivating the vacuum applied to the gripping elements 19. Alternatively, it would also be possible to make the labels 11 adhere to the blow molds by means of a suction effect.

The charging device 39 is preferably stationary and generates with the aid of one or a plurality of high-voltage electrodes an electric field through which the labels 11 pass together with the grippers 17. Alternatively, suitable electrodes may, however, be arranged on the articulated arm 15 so as to optimize the duration of charging and the distance between the electrodes and the label 11 independently of the movement of the articulated arm 15.

The coupling of the feeder star wheel 29 and the transfer device 9 can be realized not only by means of a common base plate but also by separate star wheels, which are arranged one above the other and which rotate in common. In this case, a transfer star wheel is arranged below the feeder star wheel 29 coaxially around the common axis of rotation 29'. Alternatively, the transfer device 9 could be combined in the same way with the discharge star wheel 23. The decisive aspect is that the angular range of the machine between the removal of the bottle 7 and the insertion of the preform 35 is used effectively and that the phase during which the blow mold must be fully opened for introducing the label 11 is as short as possible.

The labeler 1 according to the present disclosure can be operated as follows:

The insertion device 9, which rotates continuously together with the feeder star wheel 29, conducts an empty gripper 17, which is locked with respect to its rotary position, to the first label magazine 13. With the aid of the control cam 43 the locked condition of the gripper 17 is overcome and the outwardly positioned gripping element 19 is, following the control cam 43, moved across a label 11 in rolling contact therewith and picks the label up by means of suction. The control cam 43 continues to rotate the gripper 17 until it has been turned and locked again. Subsequently, the gripper arm 31 supported above the gripper 17 removes a preform 35 from the discharge star wheel of the oven 37. When the second control cam 43 has been reached, a second label 11 is picked up by the second, still empty gripping element 19 in the way described hereinbefore, and the gripper 17 continues to rotate until the centering tip 21 is again in alignment with the outer arm 15b and is directed away from the latter. Subsequently, the locked gripper 17 travels through the charging device 39 so as to electrostatically charge the labels 11. The charged labels 11 are then pivoted into an open blow mold 5, the centering tip 21 of the gripper 17 is locked in position centrally between the mold halves 5a,b and the gripper 17 is spread in this position so that the gripping elements 19 will bring the labels 11 into contact with the mold halves 5a,b. After deactivation of the vacuum applied to the gripping elements 19, the labels 11 will adhere to the blow mold 5 due to their electrostatically charged condition. After insertion of the preform 35 with the gripper 31 into the blow mold 5, the bottle 7 is blown in the manner known and then removed by means of the discharge star wheel 23.

In the following, additional embodiments are described, which essentially differ from the first embodiment insofar as the insertion device 9 is provided circumferentially on the blow wheel 3 and rotates coaxially with said blow wheel 3 about the axis 3'. Also in the case of these embodiments, a feeder star wheel 29, a discharge star wheel 23, at least one stationary label magazine 13 having a control cam 43 associated therewith, a charging device 39 and an oven 37 are provided. The grippers 17 correspond to those of the first embodiment, unless described otherwise. It is also possible to combine features of individual embodiments and variants thereof.

Figure 4:
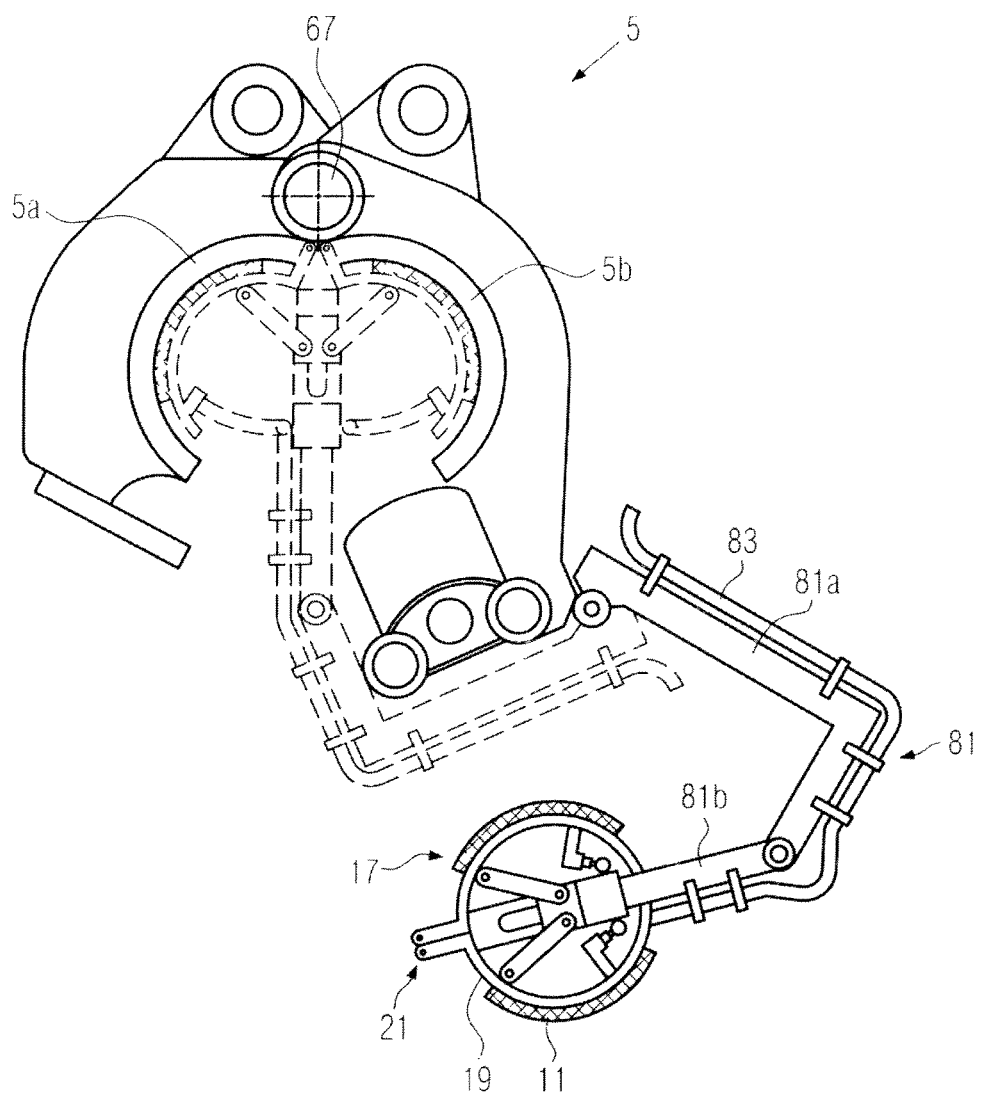
FIG. 4 shows a schematic top view of an articulated arm of a second embodiment.

As can be seen from FIG. 4, the articulated arms 81 of the second embodiment are supported in a horizontally pivotable manner on a respective mold half 5b of the blow mold 5 and comprise again an inner arm 81a, an outer arm 81b and a gripper 17 with a centering tip 21 and gripping elements 19. What can additionally be seen in FIG. 4 is a vacuum line 83 with the connections for the gripping elements 19 configured as vacuum pallets. An outer position of the articulated arm 81 for equipping the gripping elements 19 with the labels 11 and charging said labels 11, if necessary, is indicated by a solid line, and a position in which the gripper 17 is spread and the labels 11 are attached to the blow mold 5 is indicated by a broken line. As shown in FIG. 4, the inner arm 81a is preferably horizontally angled.

Alternatively, the articulated arm 81 may be mounted on the blow wheel 3 between the blow molds 5.

Since the articulated arm 81 rotates here together with the blow mold 5 about the axis of rotation 3' of the blow wheel 3, it is, other than in the case of the first embodiment, not necessary to pivot the outer arm 81b relative to the gripper 17 when the centering tip 21 has been locked in position. It follows that the second embodiment will be particularly advantageous in cases where only one label 11 has to be attached to the bottle 7 and the gripper need not be turned when it is being equipped with the label, since the connection between the outer arm 81b and the gripper 17 can then be implemented as a rigid connection.

Figure 5:
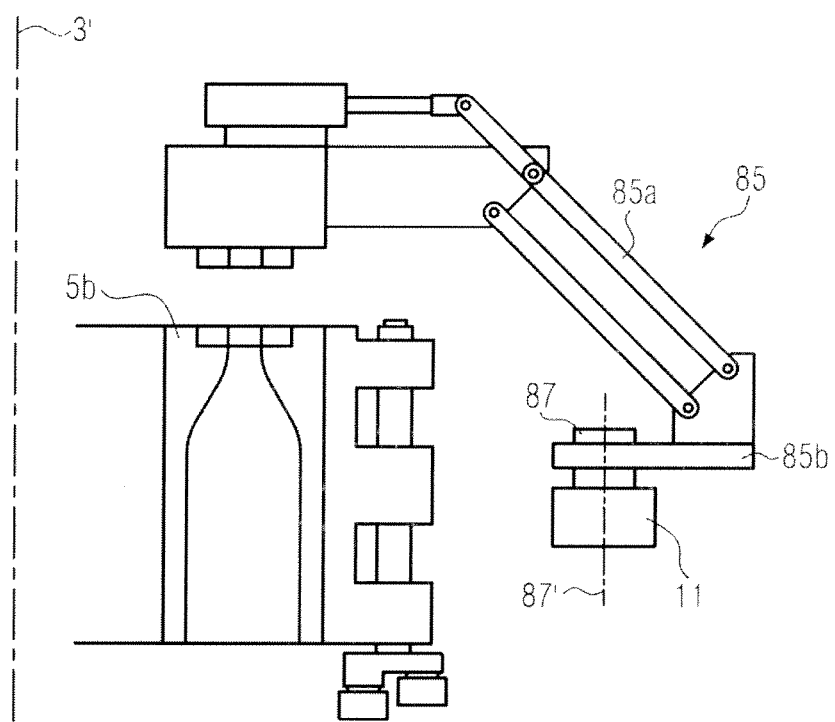
FIG. 5 shows a schematic side view of an articulated arm of a third embodiment.

According to FIG. 5, a third embodiment differs from the second embodiment primarily insofar as the articulated arm 85 is arranged on the blow wheel 3 above the blow molds 5 and is vertically pivotable. The inner and upper arm 85a consists preferably of a parallel lever while the outer and lower arm 85b consists of a horizontally oriented reception plate in which the gripper 87 for the labels 11 is supported such that it is rotatable about a vertical axis 87'.

In the case of this embodiment, it will be advantageous to raise the articulated arm 85 only for a short moment for getting out of the way of the feeder star wheel 29 and the discharge star wheel 23. The effective rotary radius of the insertion device 9 and the centrifugal forces caused as well as the relative speed to the label magazines 13 can be minimized in this way.

The invention claimed is:

1. A labeler for labeling plastic containers in the blow mold in a rotary blow molder, comprising:
    a blow wheel comprising a plurality of blow molds;
    at least one stationary label magazine; and
    a rotating insertion device for inserting labels into the blow molds the insertion device comprising articulated arms having each rotatably supported thereon a gripper, wherein the gripper comprises gripping elements adapted to be pivoted towards the blow mold.

2. A labeler according to claim 1, wherein the gripping elements are configured such that they correspond to the negative of a portion of the blow mold.

3. A labeler for labeling plastic containers in the blow mold in a rotary blow molder, comprising:
    a blow wheel comprising a plurality of blow molds;
    at least one stationary label magazine; and
    a rotating insertion device for inserting labels into the blow molds, the insertion device comprising articulated arms having each rotatably supported thereon a gripper, wherein the gripper comprises a centering tip by means of which the gripper is centrally oriented in the blow mold.

4. A labeler according to claim 1, wherein, when the gripper is pivoted into the blow mold, the rotary position of the gripper is adapted to be fixed relative to the articulated arm.

5. A labeler according to claim 1, wherein the insertion device is configured such that it removes the labels directly from the label magazine.

6. A labeler according to claim 1, wherein the gripper is controlled such that, when it picks up a label, it moves across said label in rolling contact therewith.

7. A labeler according to claim 1, wherein the gripper is able to pick up two labels at substantially opposed positions.

8. A labeler according to claim 1, and a charging device for electrostatically charging the labels for attaching them to the blow mold.

9. A labeler for labeling plastic containers in the blow mold in a rotary blow molder, comprising:
- a blow wheel comprising a plurality of blow molds;
- at least one stationary label magazine; and
- a rotating insertion device for inserting labels into the blow molds, the insertion device comprising articulated arms having each rotatably supported thereon a gripper, wherein the blow wheel comprises a feeder star wheel and a discharge star wheel, and the insertion device is arranged below the feeder star wheel or the discharge star wheel and is coupled thereto.

10. A labeler according to claim 1, and wherein the blow wheel comprises a feeder star wheel and a discharge star wheel, and the insertion device is configured as a separate transfer star wheel and is arranged between the feeder star wheel and the discharge star wheel.

11. A labeler according to claim 1, wherein the insertion device is arranged on the blow wheel.

12. A labeling method for labeling plastic containers in the blow mold in a rotary blow mold, making use of the labeler according to claim 1, comprising: a) equipping a gripper with at least one label; b) pivoting the gripper, equipped with the label, into a blow mold and centering the gripper within said blow mold by locking it in position on said blow mold or on the mold support thereof; c) spreading the gripper and attaching the label to the blow mold while maintaining the centered position of the gripper; and d) pivoting the gripper away from the blow mold.

13. A labeler according to claim 1, wherein the gripper is configured such that it can be turned when the gripper picks up the label.

14. A labeler according to claim 1, further comprising a heating device for heating the blow mold sectionwise, thereby activating a thermosensitive adhesive coating of the label.

15. A labeler according to claim 11, wherein the insertion device is arranged on the blow wheel on, between or above the blow molds.

16. A labeler according to claim 3, wherein the gripper is configured such that it can be turned when the gripper picks up the label.

17. A labeler according to claim 3, further comprising a heating device for heating the blow mold sectionwise, thereby activating a thermosensitive adhesive coating of the label.

18. A labeler according to claim 9, wherein the gripper is configured such that it can be turned when the gripper picks up the label.

19. A labeler according to claim 9, further comprising a heating device for heating the blow mold sectionwise, thereby activating a thermosensitive adhesive coating of the label.

* * * * *